(12) United States Patent
Martin

(10) Patent No.: US 6,502,684 B2
(45) Date of Patent: Jan. 7, 2003

(54) SELECTION AND SUPPLY DEVICE FOR CYLINDRICAL-TYPE PRODUCTS

(75) Inventor: Henri S. Martin, Buxy (FR)

(73) Assignee: Eastman Kodak Company, Rochester, NY (US)

( * ) Notice: Subject to any disclaimer, the term of this patent is extended or adjusted under 35 U.S.C. 154(b) by 197 days.

(21) Appl. No.: 09/734,387

(22) Filed: Dec. 11, 2000

(65) Prior Publication Data

US 2001/0004040 A1 Jun. 21, 2001

(30) Foreign Application Priority Data

Dec. 17, 1999 (FR) .............................. 99 15938

(51) Int. Cl.[7] .............................................. B65G 47/24
(52) U.S. Cl. ......................................... 193/47; 209/707
(58) Field of Search ................................. 193/399, 398, 193/46, 47, 44, 10; 209/522, 655, 698, 707

(56) References Cited

U.S. PATENT DOCUMENTS

| 876,291 A | * | 1/1908 | Blakeslee .................... 193/47 |
| 2,364,243 A | * | 12/1944 | Riddle, Jr. .................... 193/44 |
| 2,494,939 A | | 1/1950 | Nance et al. .................. 209/90 |
| 3,797,624 A | * | 3/1974 | Powell et al. ............. 193/25 R |
| 4,458,801 A | * | 7/1984 | Nichols ........................ 193/46 |
| 4,991,705 A | * | 2/1991 | Francioni ..................... 193/44 |

FOREIGN PATENT DOCUMENTS

NL 6403293 * 9/1965

* cited by examiner

Primary Examiner—Donald P. Walsh
Assistant Examiner—Mark J Beauchaine
(74) Attorney, Agent, or Firm—David A. Novais

(57) ABSTRACT

The invention relates to a mechanical device for the selection and supply of revolution cylinder type products, and more especially packaging components for photographic films. The device comprises a calibrated bent chute that includes a product supply system, with a regulating effect, and a selection system for product orientation. Selection is based on two different flows of the products. Correctly oriented products, whose axis is substantially perpendicular to that of the normal flow, follow the direction of this normal flow. Incorrectly oriented products, whose axis is substantially parallel to that of the normal flow, are deviated from the normal flow, by an opening.

7 Claims, 4 Drawing Sheets

SELECTION AND SUPPLY DEVICE FOR CYLINDRICAL-TYPE PRODUCTS

FIELD OF THE INVENTION

The present invention relates to a packaging components selection and supply device, and more particularly to a packaging component selection and supply device for revolution cylinder type products.

BACKGROUND OF THE INVENTION

The correct functioning and productivity of automatic machines are factors that are beneficial to optimize. Automatic packaging machines for photographic film spools come into this category. The entire management of the flow of assembled components, for example on an automatic machine, must take place in good conditions in a synchronous manner, and with correct positioning of these components at the entry to the machine to prevent machine stoppages. The consequences of machine stoppages are: increased stress for operators who have to intervene rapidly, deterioration of components having caused the stoppage, or even of some mechanical parts of the machine, and overall, loss of productivity.

To prevent this kind of problem, devices have been studied to prevent the inadequate positioning of components at the entry to automatic machines. These devices include fail-safe devices, position detectors, etc.

U.S. Pat. No. 4,991,705 describes a device for transporting a flow of products to be packaged, which comprises the discharge of badly or incorrectly positioned products. The device of this patent relates to, for example, food products with a flat shape that might be biscuits. The device described in the patent further relates to a means for routing flat products using a mechanical expulsion system for products badly positioned in the flow, which is based on the adoption of curves of the routing channel for flat products according to an S-shaped geometry, having the effect of giving a movement called "vertebral" to the product flow at a certain level of the routing channel. Such geometry allows badly positioned products to move onto a path that diverges from the normal flow of correctly positioned products. One disadvantage of the device thus presented is the fairly complex principle of the kinematics permitting the clearing of badly positioned products. Further, the guiding channel is calibrated according to a single direction that still, for example, allows a product to stick in a bad position under a block of correctly positioned products. Further, the device is quite bulky in the overall process environment, because of its three dimensional geometry.

European Patent EP-A-0 770 451 describes a feeding device for special nuts, the latter having an axial pilot entry and having to be presented with the same orientation, one after another, at the outlet from the feeding device; arranged with a view to feeding an automatic machine. A motor-driven rotary drum distributes, using rising vanes, the nuts into a feed chute, which feeds the automatic assembly machine by gravity. The feed chute comprises three main successive parts: the entry to recover the nuts falling from the rising vanes; a middle section where the correctly positioned nuts are sorted on the one hand from the reversed or badly positioned nuts on the other hand; and a discharge or outlet section. The correctly positioned nuts run towards the discharge or outlet section. The reversed or badly positioned nuts are cleared again to the feed drum, and then recycled. A disadvantage of this system is its complexity. Its mechanical achievement is thus expensive, with complex shapes for the feed device, and especially the feed chute, by comparison with the simplicity of the routed products. Further, adaptation to other products with different shapes or dimensions again accentuates the overall cost, because, in this case, it entails changes to the various parts of the feed chute, which is specific to each type of product; e.g. if the internal dimensions linked to nut thickness and flat dimensions vary.

Product or component supply systems in automated flows must be reliable, in order to not cause unwanted installation stoppages, either for lack of products or components, or for incorrect operating conditions. The correct positioning of products or components, just before entry into an automatic machine, and this, for example, according to a pre-set correct orientation, is an essential criterion. This is because the industrial and economic results will depend on the correct orientation of the products or components, in terms of quality, lead times, and installation productivity.

Repetitive problems due to random product arrival and positioning, according to an incorrect orientation, can lead to blockages and stoppages of the automatic machine.

SUMMARY OF THE INVENTION

The present invention relates to a device that enables the selection and the systematic and regular supply of revolution cylinder type products to be obtained. According to one embodiment, the revolution cylinder type products are packaging components intended to protect photographic films. These products having practically the shape of revolution cylinders must present one by one, in the correct orientation, at the entry to an automatic machine. This pre-set correct orientation corresponds to a product axis position that is practically perpendicular to the axis of the normal flow followed by the products, to supply the automatic machine. It is noted that within the context of the present invention, revolution cylinder type products can refer to products which are capable of rolling and have either a smooth or substantially smooth cylindrical shape.

The device comprises:

a bent chute, calibrated according to two directions perpendicular to one another and both perpendicular to an axis of a normal product flow, adapted to hold and select, one by one, revolution cylinder type products according to a pre-set correct orientation, and to let them pass one by one according to a flow direction;

an opening to deviate by a mechanical effect of gravity, according to a path different than the normal flow, the products that are positioned according to one orientation of their axis practically parallel to that of the normal flow; and an internal calibrated channel, which ensures a control function for the rate of supply to an automatic machine.

One of the main advantages of the device that is the object of the invention is to select systematically, and one by one, revolution cylinder type products to supply, with correct orientation, to the automatic machine. The indirect advantages provided by the device, to the overall production process in which it integrates, are substantial. In particular, unwanted stoppages of the automatic machine are eliminated and a fast production rate for the machine is maintained in the production time available. The cost of the device, purely mechanical, is relatively love compared with the overall cost generated by the problems encountered in the integration of the device in the product flow.

Arranged in the product flow, just before the automatic machine, the device enables the prevention of more or less long unexpected stoppages of the automatic machine during production. These stoppages involve random fast interventions by the operators which causes unnecessary stress. On the other hand, stoppages are extended if internal parts of the machine have been deteriorated; the offending products or components that are the cause of the problems are scrapped. The invention eliminates these problems and reduces production costs, while improving working conditions and the overall productivity of the process.

Thus, the present invention relates to a device for supplying an automatic machine with revolution cylinder type products according to a pre-set correct orientation. The device comprises a bent chute comprising an internal channel. The bent chute is calibrated according to two directions perpendicular to one another and perpendicular to an axis of a normal flow of the products. The bent chute is also adapted to hold and select, one by one, the revolution cylinder type products according to the pre-set correct orientation, and let them pass one by one along a direction of normal flow. The device further comprises an opening adapted to deviate, by way of a gravitational effect, a revolution cylinder type product which has an axis that is substantially parallel to the direction of normal flow. The revolution cylinder type product having an axis substantially parallel to the direction of normal flow being deviated to a direction different from the direction of normal flow. The correct orientation of the revolution cylinder type products corresponds to a position of an axis of the products which is substantially perpendicular to the axis of normal flow followed by the products.

BRIEF DESCRIPTION OF THE DRAWINGS

Other characteristics and advantages of the invention will appear on reading the description that follows, making reference to the FIGS. of the drawing annexed.

DETAILED DESCRIPTION OF THE INVENTION

Figure 1:
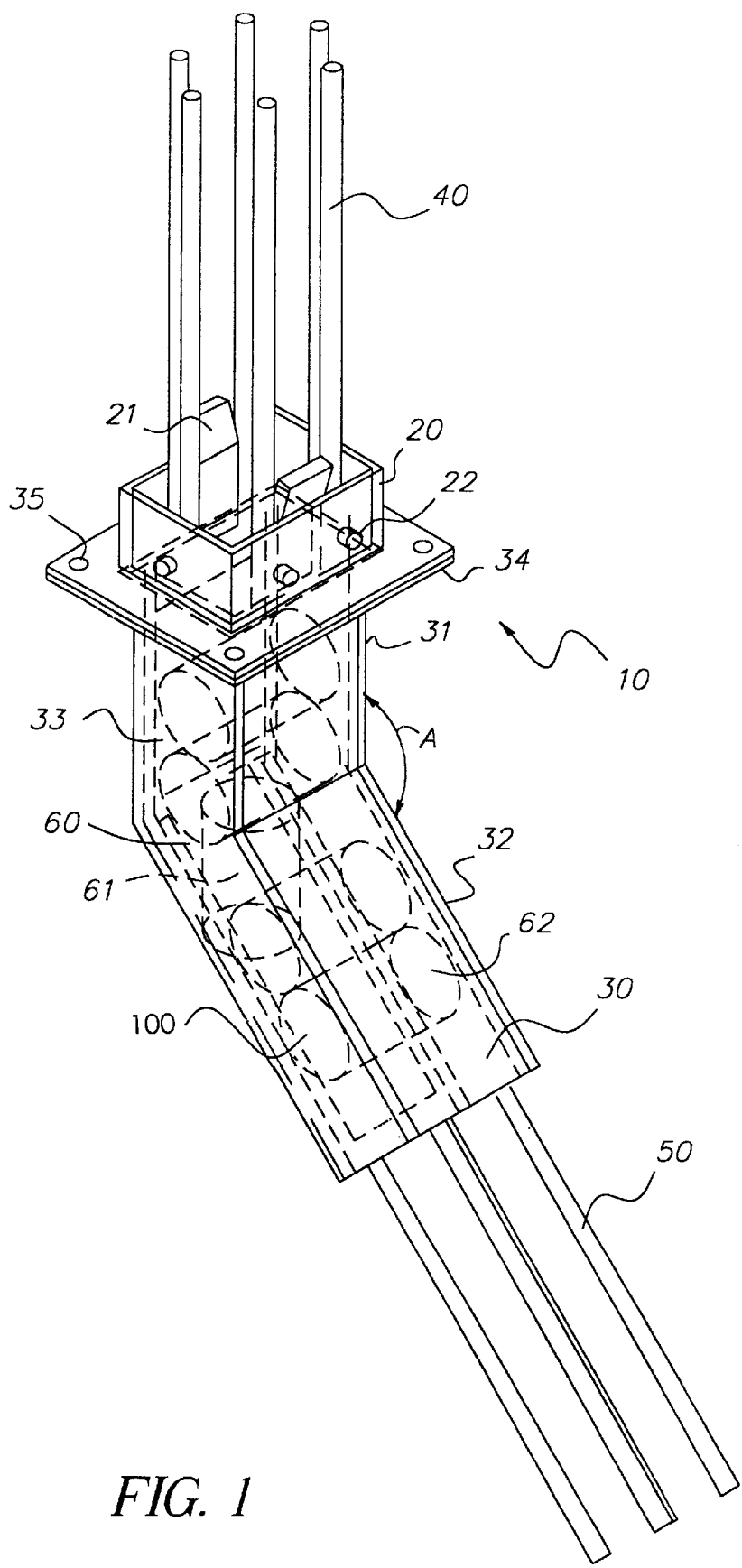
FIG. 1 represents a perspective view of the device, according to the present invention, with nearby fixing and connection parts.
Figure 2:
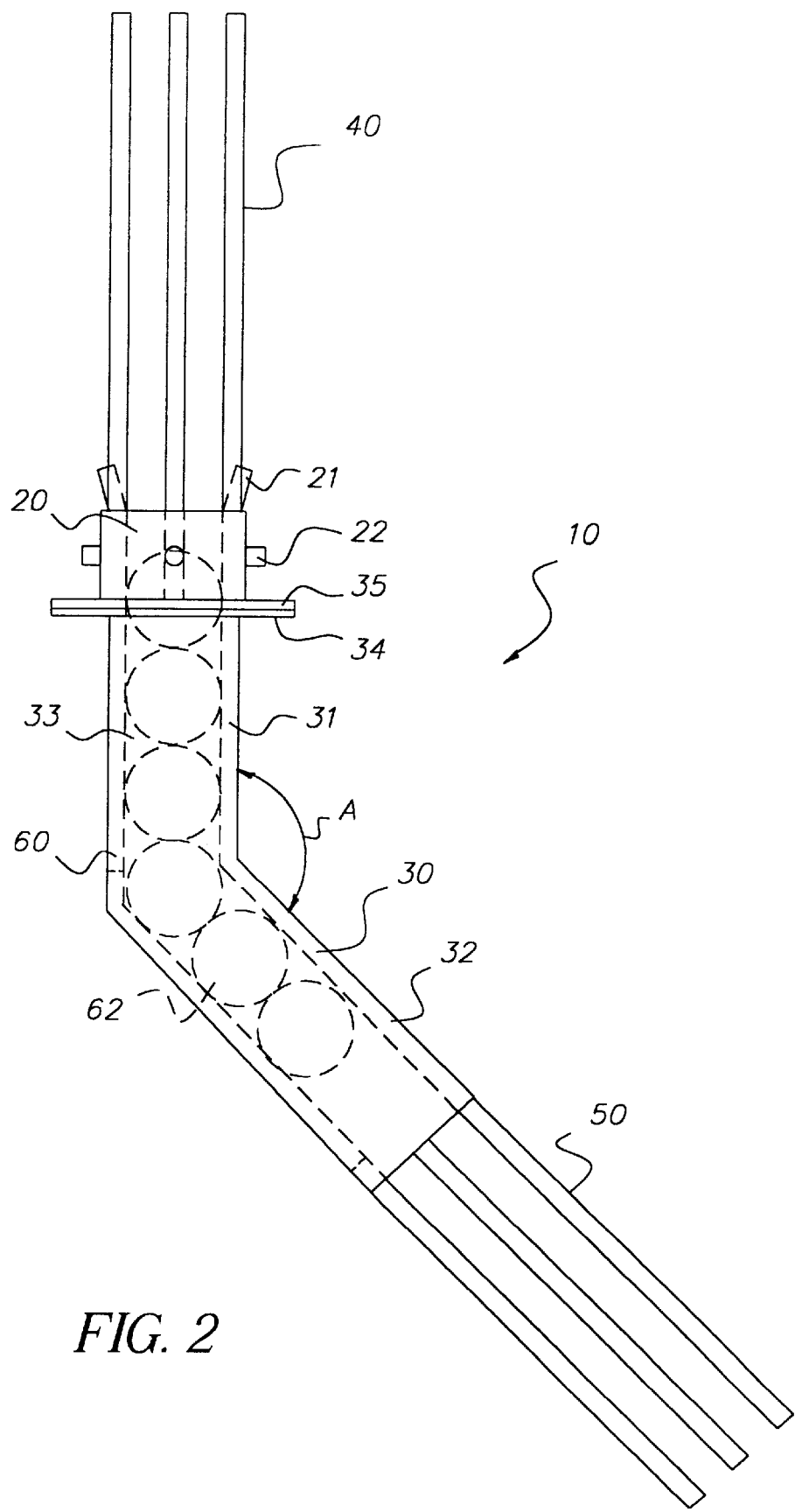
FIG. 2 represents the normal flow of a set of revolution cylinder type products, with correct orientation, in the device.

According to the invention, the device that may take the form represented diagrammatically in FIGS. 1 to 6 is arranged in relation to the product flow upstream of an automatic machine. The following detailed description refers to the various figures. of the drawings; the component parts of the invention are identified by numbers that are the same for each figure.

A device 10 comprises a calibrated bent chute 30, with two wings 31, 32 forming between them an obtuse angle A of between 120 and 150 degrees. Chute 30 represents a central body of the device. In one particular embodiment, the chute 30 can be made of stainless steel and have a rectangular external shape, with an angle A of approximately 135 degrees between wings 31 and 32. The internal part of chute 30 comprises a calibrated rectangular channel 33, preferably coaxial with the external shape of the chute 30. This internal channel 33 is calibrated in such a way as to route revolution cylinder type products 62 according to a required correct orientation 100. That is, the axis of the products 62 should be substantially perpendicular to an axis of the flow of these products. The orientation 100 reduces the risks of blocking the products 62 in the bent calibrated chute 30. The products 62, when sliding inside the chute 30, if necessary, can rotate on itself around its axis: this enables one to obtain the regular required advance. The axis of the products 62 that are routed in the calibrated channel 33 stays within an orientation tolerance of more or less five degrees compared with its nominal position, perpendicular to the axis of the flow.

Figure 6:
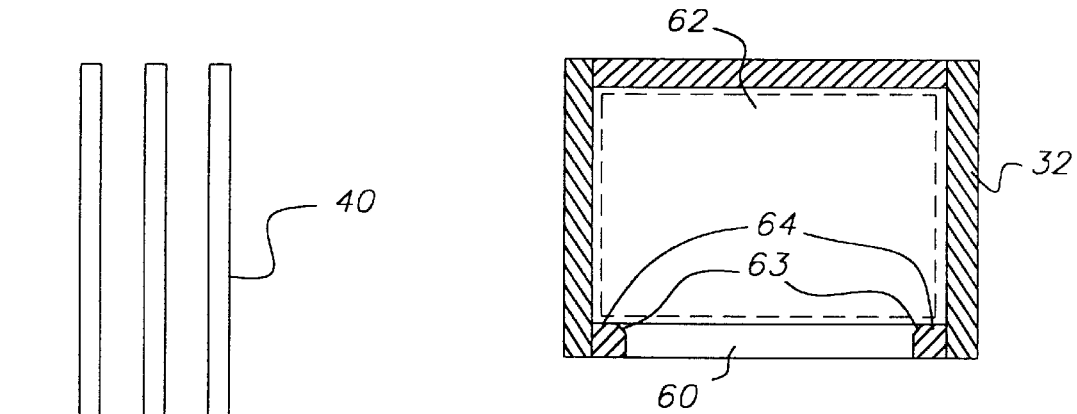
FIG. 6 represents a cross-section VI—VI, shown in FIG. 5.

The channel 33 has an entry tapered by a few degrees, to facilitate the entry of the products 100 in the upper wing 31 of the chute 30. The channel 33 is calibrated according to its rectangular cross-section, in two directions, according to the length and according to the width of this cross-section, to obtain a sliding adjustment with the revolution cylinder type products 62; this adjustment is achieved, for example, as shown in FIG. 6 between a correctly oriented product 62 and the lower wing 32 of the chute 30. Play is used, between the internal calibrated channel 33 and a correctly oriented product 62, corresponding to an adjustment called "sliding", equal to 3 to 4% of the value of the overall dimensions of the diameter and the length of the product 62. The revolution cylinder type products oriented like the product 62 are routed by gravity from the wing 31 towards the wing 32. The calibration according to two perpendicular directions enables in part for the products to pass one by one in the calibrated channel 33 by preventing any change of their orientation, and in part to have a regulating effect on the product flow, by attenuating the gravity effect or any jolts generated by the product supply system located upstream of the described device 10. The routing or normal flow of successive correctly oriented products 62 is represented for example in FIGS. 2 and 6.

A part of the chute 30 comprises an opening 60, having a rectangular shape, which essentially extends from the bottom level of the wing 31 along almost the whole length of the lower part of the wing 32; this opening enables accidentally badly oriented products to be eliminated in the part of the calibrated channel 33 belonging to the wing 31 of the chute 30. A product is badly or incorrectly oriented when its axis is practically parallel to the movement of the normal flow of the products.

Figures 3, 4:
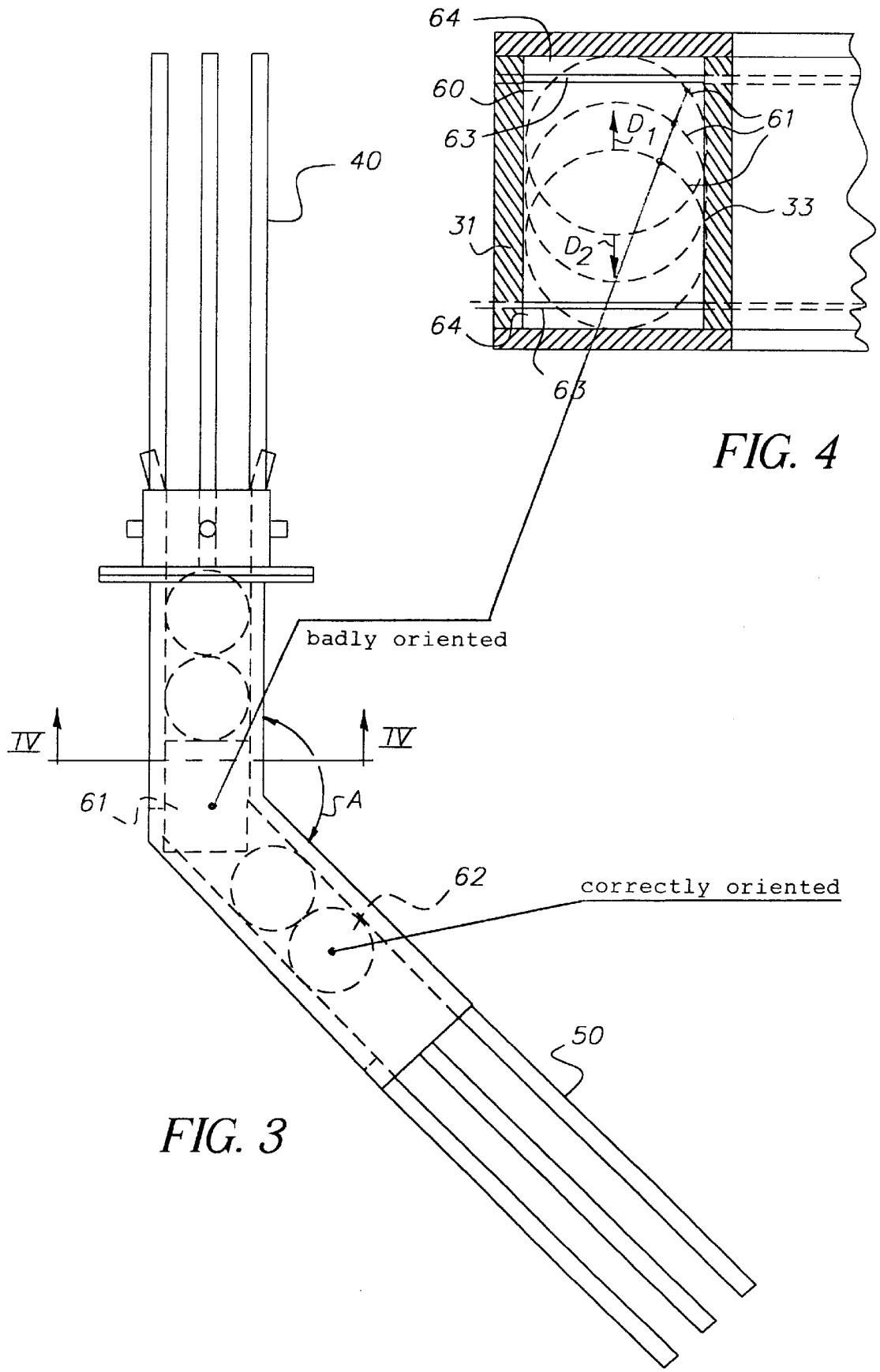
FIG. 3 represents the abnormal flow of a set of revolution cylinder type products in the device.
FIG. 4 represents a cross-section IV—IV, according to FIG. 3.
Figure 5:
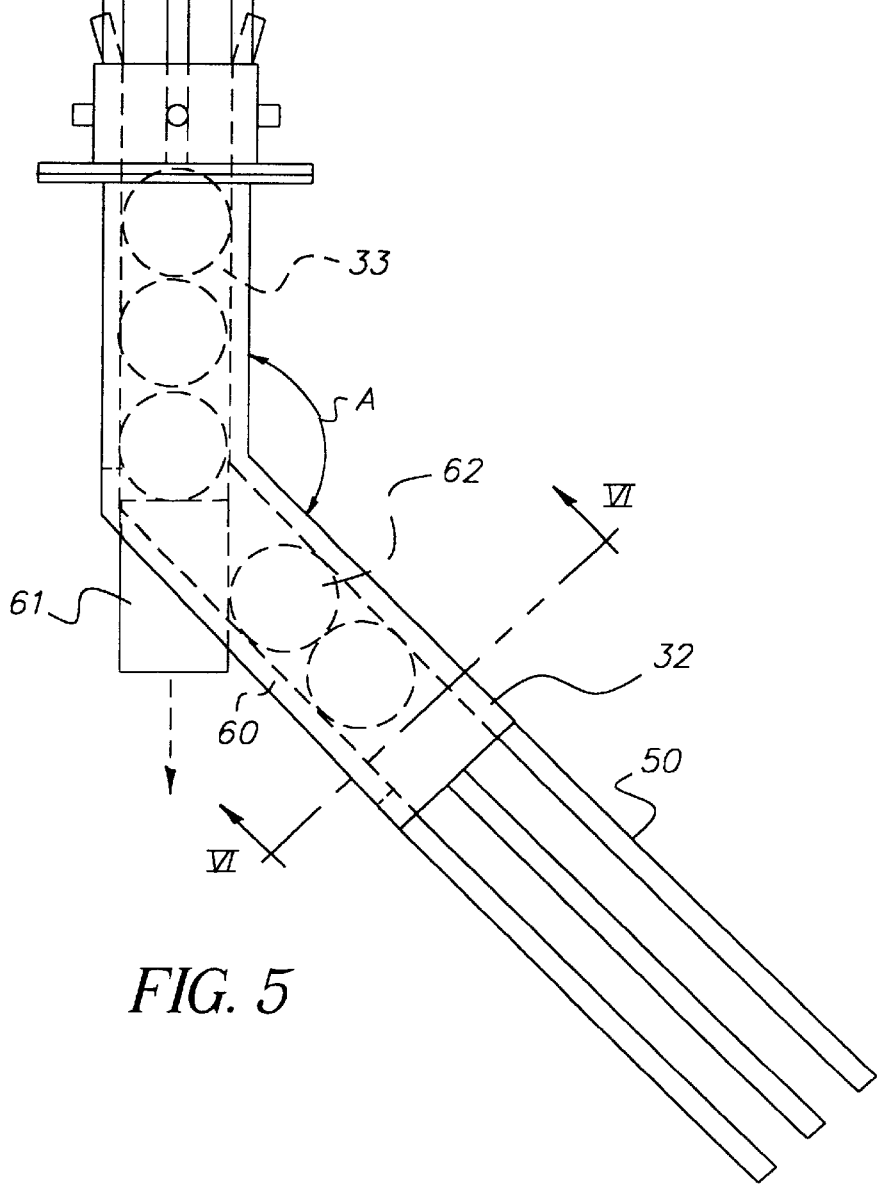
FIG. 5 represents the abnormal product flow in which a badly oriented revolution cylinder type product is deviated.

An example of a badly or incorrectly oriented product 61 is represented in FIGS. 1 and 3. When the badly oriented product 61 arrives at the level of the rectangular opening 60, it is eliminated by gravity, as shown in FIG. 5, because the length of the opening 60 is more than the maximum length of the revolution cylinder type products supplied, and the width of the opening 60 is slightly less than the minimum product length, but more than the maximum product diameter. The opening 60 overlaps a little into the lower level of the wing 31 to prevent any jamming or slowing due to a badly oriented product along the calibrated channel 33, when it leaves the normal flow through the opening 60.

FIG. 4 presents various positions of a badly or incorrectly oriented product 61, in the calibrated rectangular channel 33 of the wing 31 of the chute. If the badly oriented product 61 is in a central position between two guide edges 64 for correctly oriented products 62, it passes directly through the opening 60. If the badly oriented product 61 is in one of the extreme positions represented in FIG. 4, that is plumb with the guide edge 64, it slides in the channel 33 and touches one of the edge guides 64, but only pressing on one of its sides, it is unbalanced according to one of the directions D1 or D2, and thus slides in the opening 60. Dimensional ratios judiciously set between the dimensions of the rectangular cross-section of the calibrated channel 33, i.e. the chamfers 63 (See FIG. 6) of the edge guides 64 and the revolution cylinder type product diameter and length, cause badly oriented products 61 to leave through the opening 60, in conditions that do not disturb the normal flow of correctly oriented products 62. For example, the length of the revolution cylinder type products equals at least one and a half times the diameter of the products. Further, the clearing of badly oriented products 61 is facilitated by the force of gravity and the relative slope of the edge guides 64 compared to a horizontal plane, represented by the angle A less 90 degrees.

The upper part of the chute 30 comprises a link enabling connection with the supply system located upstream. In one particular embodiment, the upper part of the chute 30 comprises a rectangular base 34 (FIG. 1), which receives a coaxial entry plate 20; the latter is made interdependent for example with the chute 30 by four bolts (not shown) and passing through the holes 35. The geometry of the entry plate 20 is characterized by an internal funnel-shaped passage with rectangular cross-section, to receive and guide, usually according to the correct orientation, the cylinder products that arrive by gravity; this guiding is produced using added tapered parts 21, judiciously positioned to favor the guiding of the entering revolution cylinder type products by holding their axis practically perpendicular in part to the axis of normal flow, and in part to the smaller side of the calibrated rectangular cross-section of the chute.

An entry sleeve 40 is connected to the entry plate 20, coaxial to it. The geometry of the internal cross-section of the sleeve enables the routing of revolution cylinder type products to be guided, by maintaining their axis practically perpendicular to the axis of normal flow, while enabling the routing to be seen from the outside, in order to be able to prevent or locate rapidly any problem in the flow of revolution cylinder type products, a problem that is likely to disturb their normal routing.

In one particular embodiment, the sleeve 40 comprises a surrounding of cylindrical metal wires, fixed for example on the plate 20 with screws 22 represented diagrammatically; the internal cross-section of the sleeve 40 will be made to mainly wed the shape of the axial cross-section of the rolling revolution cylinder type products routed by gravity inside; thus, the products run easily in the sleeve, and the play between the products and the surrounding of metal wires does not permit turning or change of orientation of the product in the sleeve. One additional condition for the correct running of the product flow is that the internal cross-section of the sleeve 40 has no projections that might disturb the routing and orientation of the revolution cylinder type products. It being understood that the connection of this sleeve 40 with other parts, upstream from it, and not forming part of the device described, must respect the last condition given here.

On the side of the device 10, an outlet sleeve 50 is connected to the end of the wing 32, and is coaxial with it to be able to continue to guide the routing of the revolution cylinder type products leaving the device and going to the automatic machine.

In one particular embodiment, the sleeve 50 comprises cylindrical metal wires connected by welding to the wing 32 of the device. All the requirements concerning the internal cross-section geometry and the surrounding of the outlet sleeve are identical to those for the entry sleeve.

The invention has been described making reference to one particular embodiment, but it is understood that alternatives, especially of the materials, dimensions and shapes used can be made. For example, entry and outlet sleeves can be provided in transparent plastic, fixed or fitted to the entry plate 20; a bent chute 30 hinged at the level of the intersection of the wings 31 and 32.

The invention has been described in detail with particular reference to certain preferred embodiments thereof, but it will be understood that variations and modifications can be effected within the spirit and scope of the invention.

We claim:

1. A device for supplying an automatic machine with revolution cylinder type products according to a pre-set correct orientation, the device comprising:

a bent chute comprising an internal channel, said bent chute being calibrated according to two directions perpendicular to one another and perpendicular to an axis of a normal flow of the products, said bent chute being adapted to hold and select, one by one, the revolution cylinder type products according to the pre-set correct orientation, and let them pass one by one along a direction of normal flow; and an opening adapted to deviate, by way of a gravitational effect, a revolution cylinder type product which has an axis that is substantially parallel to the direction of normal flow, said revolution cylinder type product having an axis substantially parallel to the direction of normal flow being deviated to a direction different from the direction of normal flow;

wherein the correct orientation of the revolution cylinder type products corresponds to a position of an axis of the products which is substantially perpendicular to the axis of normal flow followed by said products.

2. A device according to claim 1, wherein the internal channel is adapted to regulate a supply rate of the products to the automatic machine.

3. A device according to claim 1, wherein the bent chute comprises:

first and second wings which define an obtuse angle therebetween, and a cross-section of the internal channel is calibrated to dimensions of a diameter and length of the revolution cylinder type products, so as to permit a sliding type routing of the products in the calibrated channel with their axis remaining perpendicular to the axis of the normal flow.

4. A device according to claim 3, wherein:

said opening is rectangular and is substantially located at a lower level of one of said first and second wings of the bent chute; a length of said opening being more than a maximum length of the revolution cylinder type products and a width of said opening being slightly less than a minimum length of the products, but more than their maximum diameter.

5. A device according to claim 1, further comprising:

an entry plate, fixed coaxial with the bent chute, and upstream of the chute, in the direction of the normal products flow, said plate comprising a central hole with a rectangular cross-section and a tapered entry to guide the products towards the bent chute and hold the products with their axis perpendicular to the axis of the normal flow and perpendicular to a smaller side of the rectangular cross-section.

6. A device according to claim 1, further comprising:

an entry sleeve connected to the entry plate upstream of the entry plate in the direction of the normal product flow, the entry sleeve having an internal cross-section that permits, by its shape, the routing of the products entering into the device, by holding their axis substantially perpendicular to the normal flow axis, and enabling a review of the routing of the products to be seen.

7. A device according to claim 1, further comprising:

an outlet sleeve connected to an outlet of the calibrated bent chute, the outlet sleeve having an internal cross-section that permits the routing of the products leaving the device according to the normal flow, by keeping the correct orientation, and permitting a viewing of the routing of the products to the automatic machine.

* * * * *